United States Patent [19]

Weir et al.

[11] 4,092,595
[45] May 30, 1978

[54] DATA TRANSMISSION SYSTEM FOR TRANSMITTING PRIMARY AND SECONDARY INTELLIGENCE

[75] Inventors: Donald Adams Weir, Goff's Oak, Nr. Cheshunt; Eric Stanley Usher, Ware, both of England

[73] Assignee: International Standard Electric Corporation, New York, N.Y.

[21] Appl. No.: 744,551

[22] Filed: Nov. 24, 1976

[30] Foreign Application Priority Data

Dec. 30, 1975 United Kingdom ............... 53123/75

[51] Int. Cl.² .............................................. H04L 1/00
[52] U.S. Cl. .................................... 325/38 A; 178/68; 340/347 DD
[58] Field of Search ............. 325/38 A; 340/347 DD; 178/68; 179/15 BY

[56] References Cited

U.S. PATENT DOCUMENTS

| | | | |
|---|---|---|---|
| 3,518,662 | 6/1970 | Nakagome | 325/38 A |
| 3,611,141 | 10/1971 | Waters | 325/38 A |
| 3,671,959 | 6/1972 | Amano | 325/38 A |
| 3,796,956 | 3/1974 | Fudemoto | 325/38 A |
| 3,860,908 | 1/1975 | Stratton | 340/347 DD |
| 3,870,828 | 3/1975 | Saliga | 179/15 BY |
| 3,922,495 | 11/1975 | Donohue | 179/15 BY |
| 4,003,041 | 1/1977 | van Duuren | 340/347 DD |

*Primary Examiner*—Robert L. Richardson
*Assistant Examiner*—Michael A. Masinick
*Attorney, Agent, or Firm*—John T. O'Halloran; Alfred C. Hill

[57] ABSTRACT

Data transmission in, for instance, a PCM system, is effected by translation of the binary codes into ternary combinations such that to each binary code there is provided n ternary codes with the choice of the ternary code sent being dependent on secondary intelligence, such as signalling information and/or synchronization information, to be sent. In the example described a binary bit stream is split into three bit blocks each of which is converted into a three bit ternary code.

37 Claims, 4 Drawing Figures

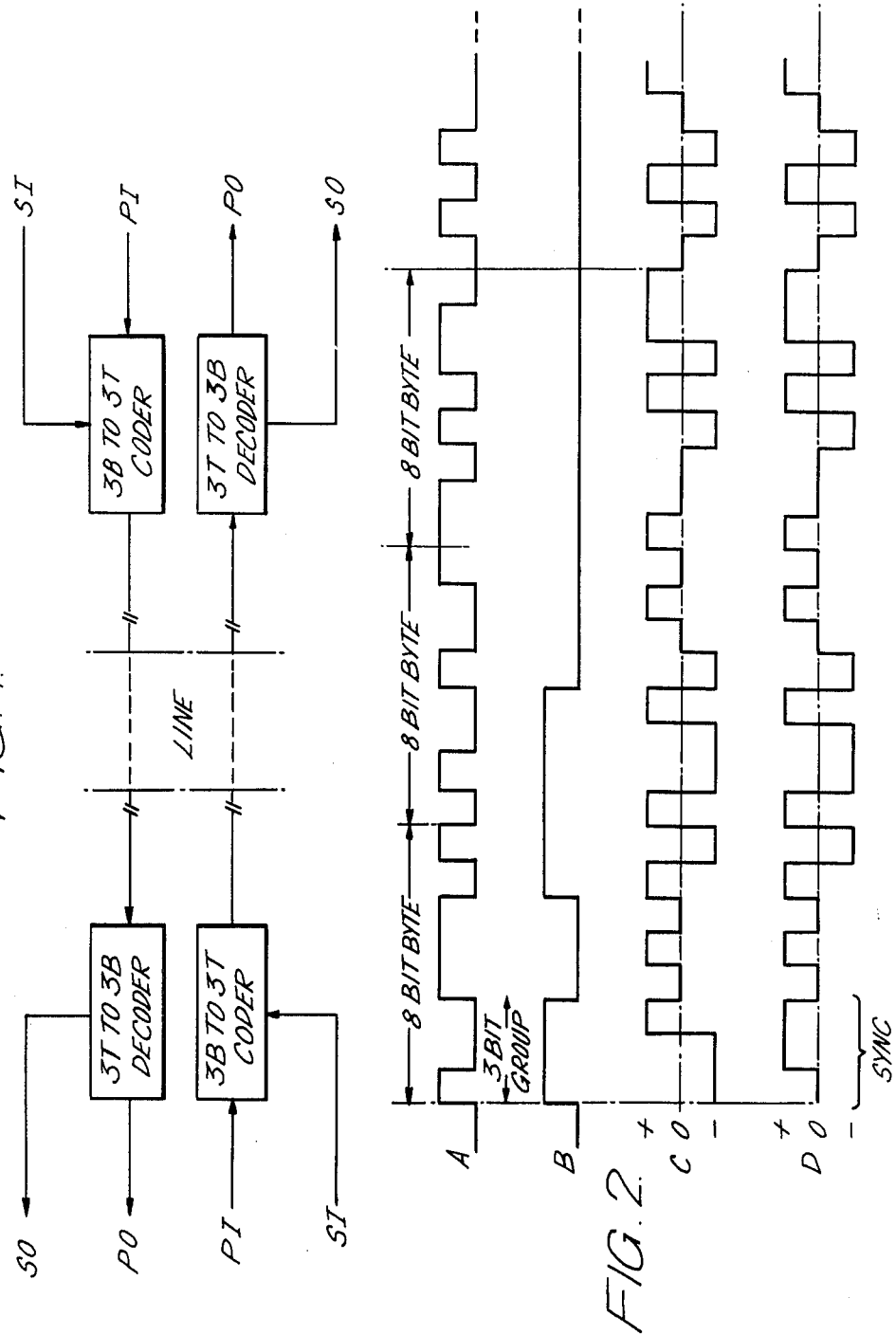

DATA TRANSMISSION SYSTEM FOR TRANSMITTING PRIMARY AND SECONDARY INTELLIGENCE

BACKGROUND OF THE INVENTION

This invention relates to data transmission systems in which intelligence is conveyed in a pulsed form, such as pulse code modulation (PCM), and especially to the use of such systems in automatic telecommunication exchange systems.

Data transmission systems are known, e.g. see U.S. Pat. No. 3,611,141, in which a binary code group is translated for data transmission into a ternary code group, with the reverse translation performed at the receiving end. Each code element of the ternary combination has three possible values, 0, + and −, and in the above-mentioned Patent, the code group as transmitted has a smaller number of elements than does the binary code group to which it corresponds.

SUMMARY OF THE INVENTION

An object of the present invention is to so exploit the characteristics of a code, such as a ternary code, as to enable secondary intelligence to be conveyed in addition to the primary intelligence. In a telecommunication exchange system the primary intelligence is normally speech while the secondary intelligence is synchronization information and/or signalling information.

A feature of the present invention is the provision of a data transmission system comprising: a transmitter portion including first means to convert groups of binary coded digital signals for transmission of primary information into groups of digital signals in a different coded form each element of which can assume any one of more than two values, the number of bits in the groups of binary coded signals and the number of bits in the groups of different coded form are such that for each one of the groups of binary coded signals there corresponds thereto $n$ different code groups in the different coded form, where $n$ is an integer greater than 1; and second means coupled to the first means to transmit secondary information in addition to the primary information in the different coded form represented by one of the groups of binary coded signals by selecting one of the $n$ different code groups in the different coded form produced from the one of the groups of binary coded signals without the secondary information causing any interference with the primary information; and a receiver portion including third means coupled to the second means to convert the primary information in the different coded form and the secondary information in the different coded form into two groups of binary coded digital signals each representing a different one of the primary information and the secondary information.

Another feature of the present invention is the provision of a data transmission transmitter comprising: first means to convert groups of binary coded digital signals for transmission of primary information into groups of digital signals in a different coded form each element of which can assume any one of more than two values, the number of bits in the groups of binary coded signals and the number of bits in the groups of different coded form are such that for each one of the groups of binary coded signals there corresponds thereto $n$ different code groups in the different coded form, where $n$ is an integer greater than 1; and second means coupled to the first means to transmit secondary information in addition to the primary information in the different coded form represented by one of the groups of binary coded signals by selecting one of the $n$ different code groups in the different coded form produced from the one of the groups of binary coded signals without the secondary information causing any interference with the primary information.

A further feature of the present invention is the provision of a data transmission receiver for receiving primary information in a coded form other than binary coded form each element of which can assume any one of more than two values and secondary information in the coded form other than binary coded form, the coded form other than binary coded form being derived by converting each group of binary coded digital signals for transmission of the primary information into $n$ groups of digital signals in the coded form other than binary coded form with the secondary information being transmitted as a selected one of the $n$ groups of the coded form other than binary, where $n$ is an integer greater than 1, the receiver comprising first means to separate the respective code conditions from an incoming different code group in the different coded form, three shift registers one per code condition, each having a capacity for $n$ bits, so that when the different code group in the different coded form has been received the contents of the three shift registers corresponds to the content of the different code group in the different coded form, a read only memory coupled to the three shift registers, the memory being used as a translation table for conversion to a binary representation, a primary information output from the memory at which the primary information appears, and a secondary information output from the memory by which the secondary information is coupled to a buffer store therefore.

Still a further feature of the present invention is the provision of a method of transmitting signalling and/or synchronization signals in a data transmitting system comprising the steps of converting groups of binary coded digital signals for transmission of primary information into groups of digital signals in a different coded form each element of which can assume any one of more than two values, the number of bits in the groups of binary coded signals and the number of bits in the groups of different coded form are such that for each one of the groups of binary coded signals there corresponds thereto $n$ different code groups in the different coded form, where $n$ is an integer greater than 1; and selecting at least one of the $n$ different code groups in the different coded form to convey signalling and/or synchronization signals without causing interference with the primary information.

Although the invention will be described with specific reference to ternary code signals it will be appreciated that the invention may be extended in that the code used for transmission may be one in which each code element has more than three possible values. In such a case it will be appreciated that the variety of secondary information which can be conveyed is enhanced as compared with a system using ternary code signals.

BRIEF DESCRIPTION OF THE DRAWING

Above-mentioned and other features and objects of this invention will become more apparent by reference to the following description taken in conjunction with the accompanying drawing, in which:

FIG. 1 is a block diagram showing the basic system in accordance with the principles of the present invention in a highly simplified manner;

FIG. 2 shows the pulse waveforms of the signals involved in the system in accordance with the principles of the present invention;

DESCRIPTION OF THE PREFERRED EMBODIMENT

Figure 3:
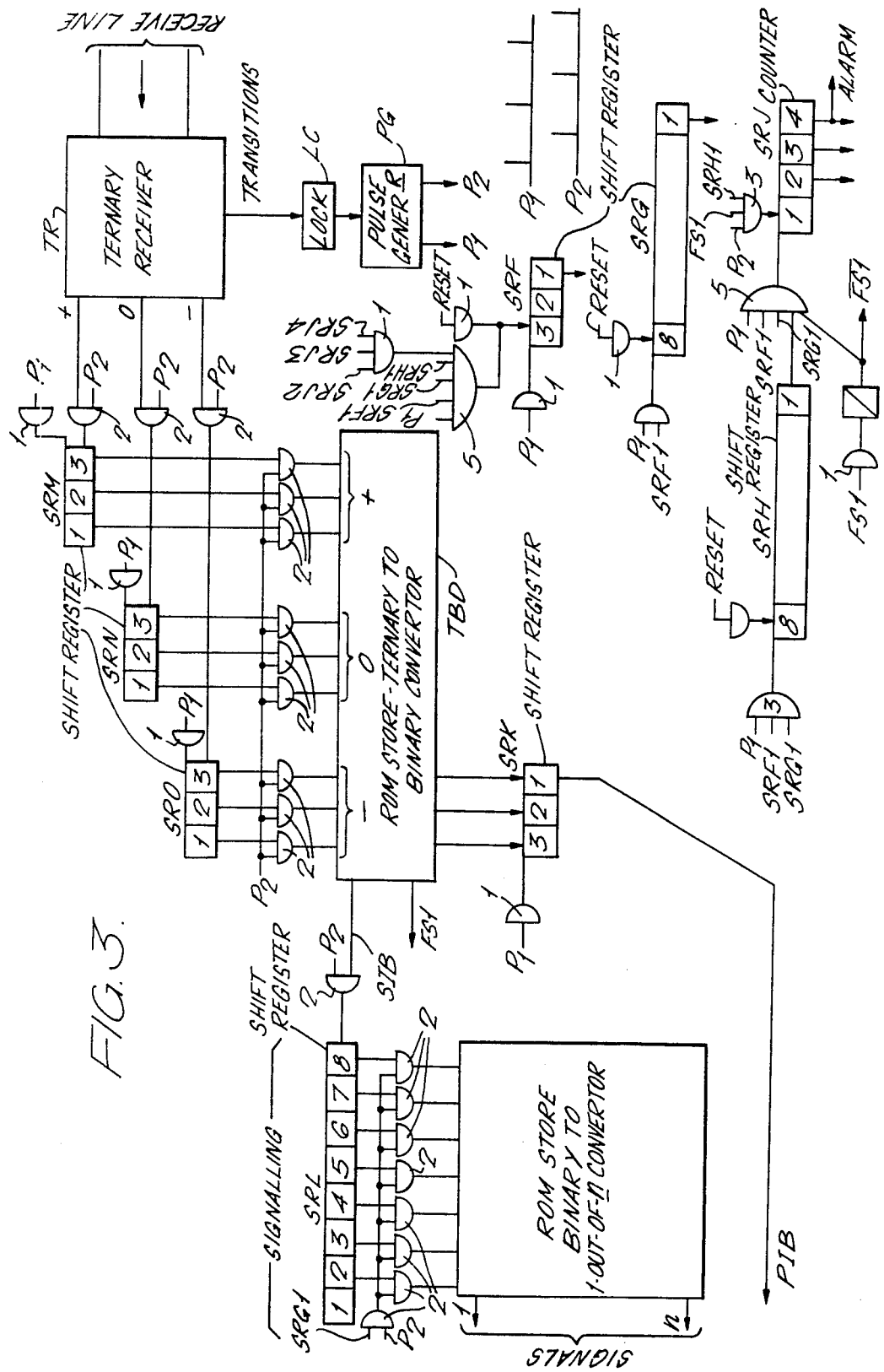
FIG. 3 is a logic diagram of a receiver for a system in accordance with the principles of the present invention.

In the system described in the above-mentioned Patent, binary groups of 4 bits each are translated into three element ternary groups, and one of the benefits due to this is a reduction in the line symbol rate by a factor of 4 to 3. However, if, as in the system described herein, the line symbol rate is the same as the binary digit rate, redundancy is introduced which is used to convey secondary information. In a telecommunication system such secondary information may be signalling (e.g. subscriber's instrument on or off hook, register recall, proceed to send, etc.) and/or synchronization information.

As indicated in the opening paragraphs, any of the general class of alphabetic codes can be used, and we herein describe the use of a 3B-3T code. That is, three-bit binary groups are converted into three-element ternary groups, so that when eight basic binary code combinations are involved we have available 27 ternary code combinations. Thus, each basic binary code can be allotted three different ternary code combinations. Depending on which ternary combination is chosen for a given binary code, different out-band secondary signalling conditions can be sent. Assuming that two such signalling conditions are needed, the third combination can be used to send out-band other information such as synchronization.

As an example, the following table sets out the code allocation used in the system to be described herein.

| Binary | Transmitted Ternary Codes | | |
|---|---|---|---|
| Input | Signalling 0 | Signalling 1 | Third Function |
| 000 | 0 + − | 0 0 − | 0 0 + |
| 001 | + 0 − | + + − | + + 0 |
| 010 | 0 − + | + − + | + 0 + |
| 100 | − 0 + | − − + | 0 + + |
| 011 | − + 0 | − + − | − 0 − |
| 101 | + − 0 | + 0 0 | − 0 0 |
| 111 | 0 + 0 | 0 − 0 | − − 0 |
| 110 | − + + | + − − | 0 − − |

The choice of ternary combinations is such that the timing content is assured, i.e. there is a minimum number of repetitions of the same state, in the above table a maximum of 4, so that the long term DC (direct current) balance is assured by making most use of low disparity combinations. Thus, the need to use scramblers is minimized or avoided.

When using the 0 or 1 signalling combinations, i.e. the ternary codes in the second and third columns, these combinations can be built into a code of a chosen length $m$ to provide $2^m$ different signalling codes. Thus, as many such codes as are needed for a particular application can be provided.

When the third function, i.e. the codes in the fourth column, is used for synchronization, which is thus also outband and does not disturb data flow, there is a risk that incorrect combinations could be found which would mimic the synchronization signal. However, by looking over a number $x$ of ternary combinations when hunting for a synchronization signal the risk of repeatedly finding a false synchronization condition can be made very small. Thus $x$ could be 8 to 16, which is only 24 to 48 bits.

The method described is applicable wherever a ternary transmission line is available, e.g. junction PCM systems, and digital PABX'S. When used with data networks this method eliminates the need for an envelope structure using extra bits or signal elements. When the system co-works with a higher order PCM system the secondary information can be extracted and sent over a common channel signalling system. At present it appears that the most important application of the present technique is over relatively short lines, in which case the combination with separate channel signalling provides a complete network system.

In FIG. 1 at each end of a four-wire line there is a 3B-3T (three bit binary to three element ternary) coder and a 3T-3B decoder. Each of the former has an input PI for primary intelligence, i.e. voice or data, and an input SI for secondary intelligence, i.e. signalling and/or synchronization. In each of these coders the primary intelligence is mixed with the secondary intelligence and so controls the output of the coder that the line signal conveys the composite signal and emits the primary intelligence over its output PO and the secondary intelligence over its output SO.

FIG. 2 shows the signals involved, in which Curve A is the primary intelligence in binary form and Curve B is the secondary intelligence, also in binary form. Note that an 8 bit byte is split among two complete 3 bit groups and parts of one or two 3 bit groups. Curve C represents the ternary coding of the three bit combinations in Curve A, according to the table above, using signalling 0 or 1 and with 1 in the synchronization position. Finally, Curve D is the same as Curve C but with synchronization combinations substituted for signalling in the frame synchronization group (the first three bits), which occurs once per frame.

Note that the original primary intelligence consists of 8 bits bytes, split as shown into 3-bit groups for conversion into ternary form, and that for each three element ternary group there is a single secondary intelligence bit which spans the three ternary elements for that group. With such a system the most convenient data format is combinations of 3 × 8 channels, resulting in 24, 48, etc. channels per system. Further, the 8 bit byte which is the basic input data is handled satisfactorily, as can be seen from FIG. 2. If the system was used with a 32 channel-8 bit PCM system, two stuffing elements per frame could be inserted to bring the number of signal elements per frame to a number which is an integral multiple of three. It would also be possible in a PCM system using 8-bit code combinations to add one bit to each code combination. This could be a parity bit, or a stuffing bit if parity bits are not needed. In this case each PCM code group is converted into three ternary groups for transmission.

Referring to FIG. 3 the receive circuit at each terminal of FIG. 1 is shown. Incoming line signals are detected by a ternary receiver TR, which issues signals on its +, 0 and − leads, which are applied to a ternary to binary decoder TBD, which consists in essence of a read-only memory in which the input-output relations are set up according to the above table. Thus if a synchronization condition is received, output FSI is energized to indicate the presence of a frame synchronization signal, whichever one of the eight possible codes in column 4 of the above table was received. Similarly when the combination is one from the second or third columns, the components of the particular combination, the three elements of the group, produce an output on the secondary intelligence lead SIB which depends on the input. In addition, whichever column of the above table contains the three element combination, an output is produced and coupled to a shift register SRK, which then contains the primary intelligence in binary form. This is then driven out by P1 pulses to the primary intelligence output PIB.

The signalling intelligence sent out via SIB is clocked by P2 pulses into a shift register SRL, which collects the seven components of a signal code since signalling combinations are assumed to be 7 bit bytes. Thus the seven components of the signal code are collected in shift register SRL, and at a time defined by P2 and stage SRG 1 of shift register SRG, this code is applied to the column inputs of a ROM used as a binary to 1-out-of-$n$ convertor. Thus an output is produced on one of these $n$ leads to indicate the signal which has been received.

The ternary receiver TR also gives an output for each transition in the received signal stream, these outputs being applied to control a lock circuit LC which holds the pulse generator PG at the right frequency of its out-of-phase outputs P1 and P2. Shift registers SRF, SRG and SRH are cascaded and, under P1 control they respectively divide by 3 to give the signalling system's bit rate, by 8 to give the signalling system's word rate, and by 8 again to give the system's total frame. As indicated above an output from stage 1 of SRG controls transfer of the signalling word from shift register SRL to the convertor.

Shift registers SRF, SRG and SRH, with counter SRJ, provide the synchronization monitor to ensure that synchronization is maintained. SRJ is a counter which counts the number of occasions on which FSI does not coincide with the appropriate SRF-SRG-SRH output combination, the output from these sources causing counter SRJ to step once on each such discrepancy. If there is no discrepancy, counter SRJ is reset to 1, but if the discrepancy continues, then after counter SRJ steps to SRJ 4 an alarm is given. As will be seen from the gating, counter SRJ off-normal causes shift register SRF to be reset, so that a successive correction of one unit period occurs each time the cycle end occurs when counter SRJ is off normal. This means that correction only occurs if disparity has occurred twice in succession since it is on the second occurrence of this that the reset takes place, and this is nullified by an output from FSI if it should coincide at the right time. Thus the correction occurs successively, one unit at a time, until the system is in sync. In the meantime, of course, the alarm may have been given, but this is cleared when the synchronization is achieved.

Figure 4:
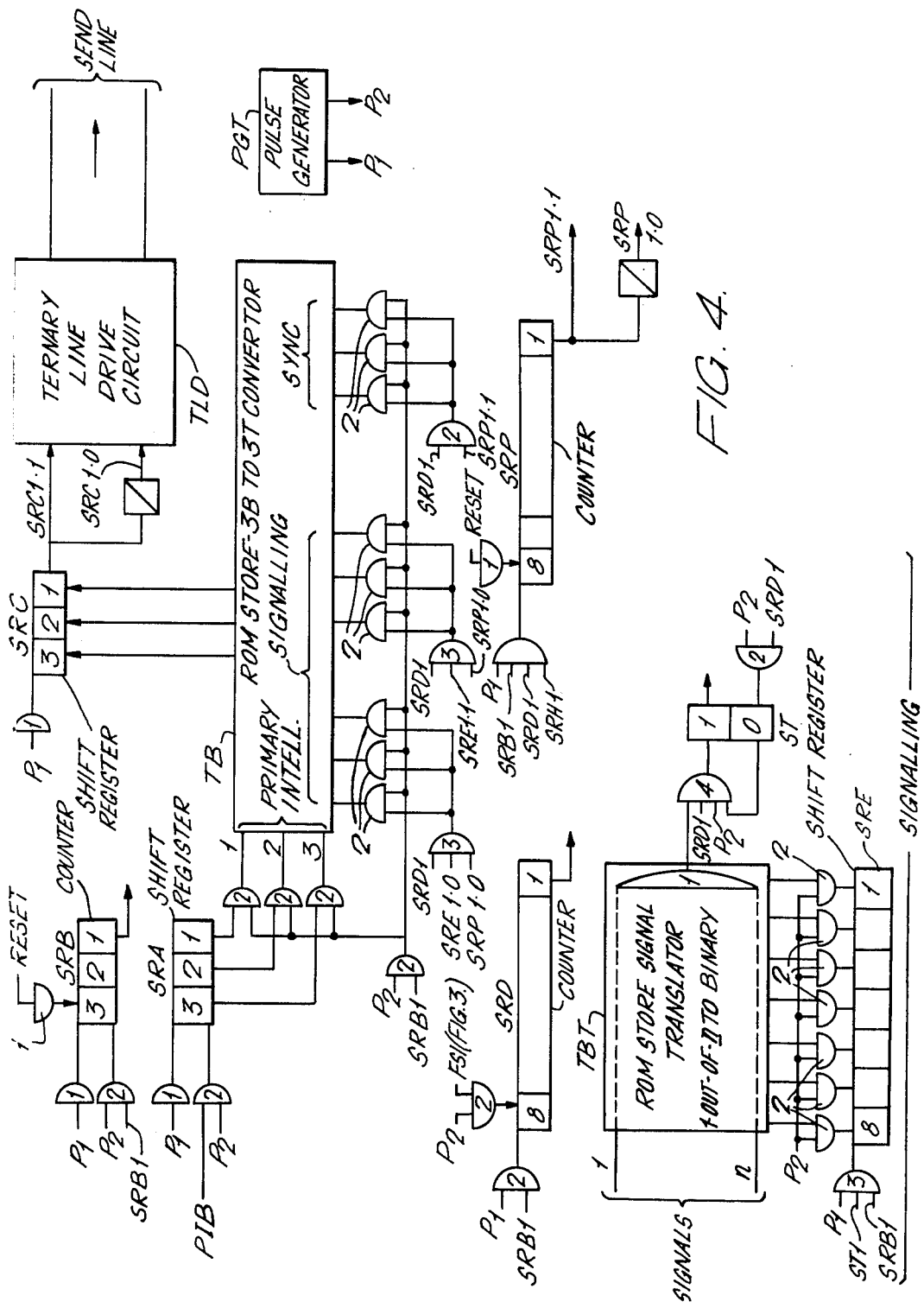
FIG. 4 is a logic diagram of a transmitter for a system in accordance with the principles of the present invention.

FIG. 4 shows the transmitter equipment at each terminal of FIG. 1. Here the primary intelligence is received serially in binary form over an input PIB from which it is applied to a shift register SRA the outputs of which are applied parallelwise to form the selection ordinates of a read only memory TB which converts the three-bit binary code combinations to their three element ternary equivalents. As in the above table, the outputs of this ROM are effectively in three sets, Signalling 0, Signalling 1 and Synchronization. The counters SRB, SRD and SRP together define a complete frame, with counter SRB counting three line bits, counter SRD counting eight cycles of counter SRB, and counter SRP counting eight cycles of counter SRD to define a frame. When all three of these counters are at 1, the gate controlling the synchronization outputs of read only memory TB is opened, and admits a signal to choose the synchronization column output equivalent to the three-bit binary code applied by shift register SRA to read only memory TB. For all other corresponding positions the choice is between Signalling 0 and Signalling 1, which is determined by the output of shift register SRE at 1. This indicates the signal bit values derived from the ROM store TBT which provides signal translation from 1-out-of-$n$ to binary. Signals are offered to this store on single leads, and each signal results in the output of signal bits into shift SRE at a time defined by the frame counter (SRB - SRD - SRP), which ensures that the signalling codes are correctly related to the frame time positions.

The output of the converter TB is applied parallelwise to a shift register SRC from which the output signal is applied serially to a ternary line drive circuit TLD, which sends ternary signals to the remote station.

The circuit of FIG. 4 includes its own pulse generator PGT, but it should be noted that if the send circuitry is slaved to the receive circuitry, PGT is not needed, and the P1 and P2 pulses can be obtained from the pulse generator PG of FIG. 3.

The above description has, for clarity, concentrated on the use of 3-bit binary to three element ternary translation but other forms of binary to ternary translation can be used. Thus if a 4-bit binary to four element ternary translation is used the 81 ternary codes could easily provide the three equivalent values as in the above system. Indeed a 4-bit binary to four element ternary system would permit equivalent duplicate values for synchronization and signalling, so that the 8 bits of the signalling word could be used for both signalling and synchronization if desired. Such a translation technique could well be preferred in a PCM system in which each PCM code group consists of eight binary bits.

While we have described above the principles of our invention in connection with specific apparatus it is to be clearly understood that this description is made only by way of example and not as a limitation to the scope of our invention as set forth in the objects thereof and in the accompanying claims.

We claim:
1. A data transmission system comprising:
a transmitter portion including
first means to convert groups of binary coded digital signals for transmission of primary information into groups of digital signals in a different coded form each element of which can assume any one of more than two values, the number of bits in said groups of binary coded signals and the number of bits in said groups of different coded form are such that for each one of said groups of binary coded signals there corresponds thereto $n$ different code groups in said different coded form, where $n$ is an integer greater than 1; and
second means coupled to said first means to transmit secondary information in addition to said primary information in said different coded form represented by one of said groups of binary coded signals by selecting one of said $n$ different code groups in said different coded form produced from said one of said groups of binary coded signals without said secondary information causing any interference with said primary information; and a receiver portion including
third means coupled to said second means to convert said primary information in said different coded form and said secondary information in said different coded form into two groups of binary coded digital signals each representing a different one of said primary information and said secondary information.

2. A system according to claim 1, wherein said secondary information is a synchronization signal.

3. A system according to claim 1, wherein said third means includes
fourth means to separate the respective code conditions from an incoming ternary code group, said code conditions being the value of each bit of said ternary code group,
three shift registers one per code condition, each having a capacity for $n$ bits, so that when said ternary code group has been received the contents of each of said three shift registers correspond to a different value of said bits of said ternary code group,
a read only memory coupled to said three shift registers, said memory being used as a translation table for conversion to a binary representation,
a primary information output from said memory at which said primary information appears, and
a secondary information output from said memory by which said secondary information is coupled to a buffer store therefore.

4. A system according to claim 1, wherein said secondary information is a signalling signal.

5. A system according to claim 4, wherein said secondary information is a synchronization signal spaced from said signalling signal.

6. A system according to claim 1, wherein said groups of binary coded digital signals are pulse code modulation code groups each of which is converted into at least two code groups of said different coded form.

7. A system according to claim 6, wherein said different coded form is a ternary code.

8. A system according to claim 1, wherein said second means includes
selection means coupled to said first means, said selection means being under control of said secondary information to select one of said $n$ different code groups in said different coded form to be transmitted and to apply said selected one of said $n$ different code groups in said different coded form to an output.

9. A system according to claim 8, wherein said third means includes
fourth means to separate the respective code conditions from an incoming different code group in said different coded form, said code conditions being the value of each bit of said incoming different code group,
three shift registers one per code condition, each having a capacity for $n$ bits, so that when said different code group in said different coded form has been received the contents of each of said three shift registers corresponds to a different value of said bits of said different code group in said different coded form,
a read only memory coupled to said three shift registers, said memory being used as a translation table for conversion to a binary representation,
a primary information output from said memory at which said primary information appears, and
a secondary information output from said memory by which said secondary information is coupled to a buffer store therefore.

10. A system according to claim 1, wherein said first means includes
a shift register into which each of said groups of binary coded signals to be converted is sequentially inserted, and
a first read only memory to effect the conversion coupled in parallel to said shift register, said first read only memory generating said $n$ different code groups in said different coded form.

11. A system according to claim 10, wherein said second means includes
selection means coupled to said first read only memory, said selection means being under control of said secondary information to select one of said $n$ different code groups in said different coded form to be transmitted and to apply said selected one of said $n$ different code groups in said different coded form to an output.

12. A system according to claim 11, wherein said third means includes
fourth means to separate the respective code conditions from an incoming different code group in said different coded form, said code conditions being the value of each bit of said incoming different code group,
three shift registers one per code condition, each having a capacity for $n$ bits, so that when said different code group in said different coded form has been received the contents of each of said three shift registers corresponds to a different value of said bits of said different code group in said different coded form,
a second read only memory coupled to said three shift registers, said second memory being used as a translation table for conversion to a binary representation,
a primary information output from said second memory at which said primary information appears, and
a secondary information output from said second memory by which said secondary information is coupled to a buffer store therefore.

13. A system according to claim 1, wherein said different coded form is a ternary code.

14. A system according to claim 13, wherein said third means includes
fourth means to separate the respective code conditions from an incoming ternary code group, said code conditions being the value of each bit of said ternary code group,
three shift registers one per code condition, each having a capacity for $n$ bits, so that when said ternary code group has been received the contents of each of said three shift registers correspond to a different value of said bits of said ternary code group, a read only memory coupled to said three shift registers, said memory being used as a translation table for conversion to a binary representation, a primary information output from said memory at which said primary information appears, and a secondary information output from said memory by which said secondary information is coupled to a buffer store therefore.

15. A system according to claim 13, wherein said second means includes selection means coupled to said first means, said selection means being under the control of said secondary information to select one of said $n$ different ternary groups to be transmitted and to apply said selected one of said $n$ different ternary groups to an output.

16. A system according to claim 15, wherein said third means includes fourth means to separate the respective code conditions from an incoming ternary code group, said code conditions being the value of each bit of said ternary code group, three shift registers one per code condition, each having a capacity for $n$ bits, so that when said ternary code group has been received the contents of each of said three shift registers correspond to a different value of said bits of said ternary code group, a read only memory coupled to said three shift registers, said memory being used as a translation table for conversion to a binary representation, a primary information output from said memory at which said primary information appears, and a secondary information output from said memory by which said secondary information is coupled to a buffer store therefore.

17. A system according to claim 13, wherein said first means includes a shift register into which each of said groups of binary coded signals to be converted is sequentially inserted, and a first read only memory to effect the conversion coupled in parallel to said shift register, said first read only memory generating said $n$ different ternary groups.

18. A system according to claim 17, wherein said second means includes selection means coupled to said first read only memory, said selection means being under the control of said secondary information to select one of said $n$ different ternary groups to be transmitted and to apply said selected one of said $n$ different ternary groups to an output.

19. A system according to claim 18, wherein said third means includes fourth means to separate the respective code conditions from an incoming ternary code group, said code conditions being the value of each bit of said ternary code group, three shift registers one per code condition, each having a capacity for $n$ bits, so that when said ternary code group has been received the contents of each of said three shift registers correspond to a different value of said bits of said ternary code group, a second read only memory coupled to said three shift registers, said second memory being used as a translation table for conversion to a binary representation, a primary information output from said second memory at which said primary information appears, and a secondary information output from said second memory by which said secondary information is coupled to a buffer store therefore.

20. A data transmission transmitter comprising:

first means to convert groups of binary coded digital signals for transmission of primary information into groups of digital signals is a different coded form each element of which can assume any one of more than two values, the number of bits in said groups of binary coded signals and the number of bits in said groups of different coded form are such that for each one of said groups of binary coded signals there corresponds thereto $n$ different code groups in said different coded form, where $n$ is an integer greater than 1; and second means coupled to said first means to transmit secondary information in addition to said primary information in said different coded form represented by one of said groups of binary coded signals by selecting one of said $n$ different code groups in said different coded form produced from said one of said groups of binary coded signals without said secondary information causing any interference with said primary information.

21. A transmitter according to claim 20, wherein said secondary information is a synchronization signal.

22. A transmitter according to claim 20, wherein said second means includes selection means coupled to said first means, said selection means being under control of said secondary information to select one of said $n$ different code groups in said different coded form to be transmitted and to apply said selected one of said $n$ different code groups in said different coded form to an output.

23. A transmitter according to claim 20, wherein said secondary information is a signalling signal.

24. A transmitter according to claim 23, wherein said secondary information is a synchronization signal spaced from said signalling signal.

25. A transmitter according to claim 20, wherein said groups of binary coded digital signals are pulse code modulation code groups each of which is converted into at least two code groups of said different coded form.

26. A transmitter according to claim 25, wherein said different coded form is a ternary code.

27. A transmitter according to claim 20, wherein said first means includes a shift register into which each of said groups of binary coded signals to be converted is sequentially inserted, and a first read only memory to effect the conversion coupled in parallel to said shift register, said first read only memory generating said $n$ different code groups in said different coded form.

28. A transmitter according to claim 27, wherein said second means includes selection means coupled to said first read only memory, said selection means being under control of said secondary information to select one of said $n$ different code groups in said different coded form to be transmitted and to apply said selected one of said *n* different code groups in said different coded form to an output.

29. A transmitter according to claim 20, wherein said different coded form is a ternary code.

30. A transmitter according to claim 29, wherein said second means includes selection means coupled to said first means, said selection means being under the control of said secondary information to select one of said *n* different ternary groups to be transmitted and to apply said selected one of said *n* different ternary groups to an output.

31. A transmitter according to claim 29, wherein said first means includes a shift register into which each of said groups of binary coded signals to be converted is sequentially inserted, and a first read only memory to effect the conversion coupled in parallel to said shift register, said first read only memory generating said *n* different ternary groups.

32. A transmitter according to claim 31, wherein said second means includes selection means coupled to said first read only memory, said selection means being under the control of said secondary information to select one of said *n* different ternary groups to be transmitted and to apply said selected one of said *n* different ternary groups to an output.

33. A transmitter according to claim 32, wherein said third means inclues fourth means to separate the respective code conditions from an incoming ternary code group, said code conditions being the value of each bit of said ternary code group, three shift registers one per code condition, each having a capacity for *n* bits, so that when said ternary code group has been received the contents of each of said three shift registers correspond to a different value of said bits of said ternary code group, a second read only memory coupled to said three shift registers, said second memory being used as a translation table for conversion to a binary representation, a primary information output from said second memory at which said primary information appears, and a secondary information output from said second memory by which said secondary information is coupled to a buffer store therefore.

34. A data transmission receiver for receiving primary information in a coded form other than binary coded form each element of which can assume any one of more than two values and secondary information in said coded form other than binary coded form, said coded form other than binary coded form being derived by converting each group of binary coded digital signals for transmission of said primary information into *n* groups of digital signals in said coded form other than binary coded form with said secondary information being transmitted as a selected one of said *n* groups of said coded form other than binary, where *n* is an integer greater than 1, said receiver comprising first means to separate the respective code conditions from an incoming different code group in said different coded form, said code conditions being the value of each bit of said incoming different code group, three shift registers one per code condition, each having a capacity for *n* bits, so that when said different code group in said different coded form has been received the contents of said three shift registers corresponds to a different value of said bits of said different code group in said different coded form, a read only memory coupled to said three shift registers, said memory being used as a translation table for conversion to a binary representation, a primary information output from said memory at which said primary information appears, and a secondary information output from said memory by which said secondary information is coupled to a buffer store therefore.

35. A receiver according to claim 34, wherein said different coded form is a ternary code.

36. A method of transmitting signalling and/or synchronization signals in a data transmitting system comprising the step of converting groups of binary coded digital signals for transmission of primary information into groups of digital signals in a different coded form each element of which can assume any one of more than two values, the number of bits in said groups of binary coded signals and the number of bits in said groups of different coded form are such that for each one of said groups of binary coded signals there corresponds thereto *n* different code groups in said different coded form, where *n* is an integer greater than 1; and selecting at least one of said *n* different code groups in said different coded form to convey signalling and/or synchronization signals without causing interference with said primary information.

37. A method according to claim 36, wherein said different coded form is a ternary code.

* * * * *